United States Patent
Summers et al.

(10) Patent No.: US 10,523,532 B1
(45) Date of Patent: Dec. 31, 2019

(54) MULTIPLE QUEUEING FOR DISTRIBUTED ENVIRONMENTS

(71) Applicant: Amazon Technologies, Inc., Seattle, WA (US)

(72) Inventors: Carl Wesley Summers, Bainbridge Island, WA (US); Nataraj Mocherla, Seattle, WA (US); Jungwoo Jang, Bellevue, WA (US); Arvinth Ravi, Seattle, WA (US); Ayush Goyal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 226 days.

(21) Appl. No.: 15/472,160

(22) Filed: Mar. 28, 2017

(51) Int. Cl.
*H04L 29/08* (2006.01)
*H04L 12/24* (2006.01)

(52) U.S. Cl.
CPC ......... *H04L 41/5051* (2013.01); *H04L 67/10* (2013.01)

(58) Field of Classification Search
CPC ................................. G06F 9/50; H04L 47/125
See application file for complete search history.

(56) References Cited

U.S. PATENT DOCUMENTS

| | | | |
|---|---|---|---|
| 8,953,453 B1* | 2/2015 | Xiao | H04L 47/12 370/230 |
| 9,274,710 B1* | 3/2016 | Oikarinen | G06F 3/061 |
| 9,294,558 B1* | 3/2016 | Vincent | H04L 67/1006 |
| 9,313,604 B1* | 4/2016 | Holcombe | H04W 28/06 |
| 9,424,075 B1* | 8/2016 | Halim | G06F 9/542 |
| 9,449,008 B1* | 9/2016 | Oikarinen | G06F 16/1774 |
| 9,509,616 B1* | 11/2016 | Judge | H04L 47/125 |
| 2013/0262678 A1* | 10/2013 | Tung | G06F 9/5072 709/226 |
| 2014/0059551 A1* | 2/2014 | Umanesan | H04L 67/1097 718/102 |
| 2016/0139952 A1* | 5/2016 | Geng | G06F 9/4818 718/103 |
| 2016/0179711 A1* | 6/2016 | Oikarinen | G06F 3/061 710/40 |
| 2016/0212060 A1* | 7/2016 | Holcombe | H04W 28/06 |
| 2017/0063989 A1* | 3/2017 | Langouev | H04L 49/90 |
| 2017/0078203 A1* | 3/2017 | Judge | H04L 47/125 |
| 2017/0078204 A1* | 3/2017 | Judge | H04L 47/125 |
| 2017/0351873 A1* | 12/2017 | Luff | G06F 9/54 |
| 2018/0176819 A1* | 6/2018 | Papa | H04W 28/0289 |
| 2018/0375784 A1* | 12/2018 | Balakrishnan | H04L 47/6275 |

* cited by examiner

*Primary Examiner* — Shirley X Zhang
(74) *Attorney, Agent, or Firm* — Davis Wright Tremaine LLP

(57) ABSTRACT

Computing resource service providers provide computing resources to a plurality of customers. To avoid customers experiencing a degradation in service associated with the computing resources provided to customers, a main queue and a sideline queue may be used to manage and distribute customer events to service endpoints. Customer events may be placed in a main queue and transmitted, by a delivery host, to a service endpoint. If the delivery host receives a throttle response from the service endpoint, the delivery host may enqueue the customer event in a sideline queue and generate and/or store state information associated with the customer event. The state information may include an interval of time at the expiration of which the customer event may be retransmitted to the service endpoint.

20 Claims, 9 Drawing Sheets

MULTIPLE QUEUEING FOR DISTRIBUTED ENVIRONMENTS

BACKGROUND

A data center is a facility that houses computer systems and various networking storage, and other related components. Data centers may, for example, provide computing services to businesses and individuals as a remote computing service or provide infrastructure, platforms, or software as a service. To facilitate the utilization of data center resources, virtualization technologies may allow a single physical computing machine to host one or more instances of virtual machines that appear and operate as independent computer machines to a connected computer user. With virtualization, the single physical computing device can create, maintain, or delete multiple virtual machines in a dynamic manner.

In a large distributed computing system (e.g., multiple distributed data centers) of a computing resource service provider, various services and resources of the computing resource service provider are frequently utilized to execute a variety of different operations and/or applications. Balancing customer access to the computing resources and keeping the system secure becomes more challenging as the complexity and usage of the system increases. In such distributed computing systems, it can be difficult to manage utilization of the systems. Furthermore, it can also be difficult to isolate and troubleshoot issues with the systems, and even when issues are identified, reliably distributing the resources of the systems may be challenging. Providing remote services in a cost-effective manner can be challenging. For instance, a computing resource service provider can use the same hardware to support multiple resources.

While the hardware may be able to support average resource usage demand of multiple customers, there can be points at which overloading occurs, such as when multiple virtual machines concurrently increase utilization of limited hardware resources. In general, a computing resource, such as a physical host, is considered to be in an "overloaded" state if it is not able to provide a defined level of capacity for at least some measure of capacity (e.g., CPU cycles, network bandwidth, latency, etc.) for at least some portion of customer requests it receives. Furthermore, different hardware and software configurations of the computing resources used to provide remote program execution and remote data storage may affect performance and cause degradation of the computing resources during intervals of heavy utilization.

BRIEF DESCRIPTION OF THE DRAWINGS

Various techniques will be described with reference to the drawings, in which.

DETAILED DESCRIPTION

Figure 1:
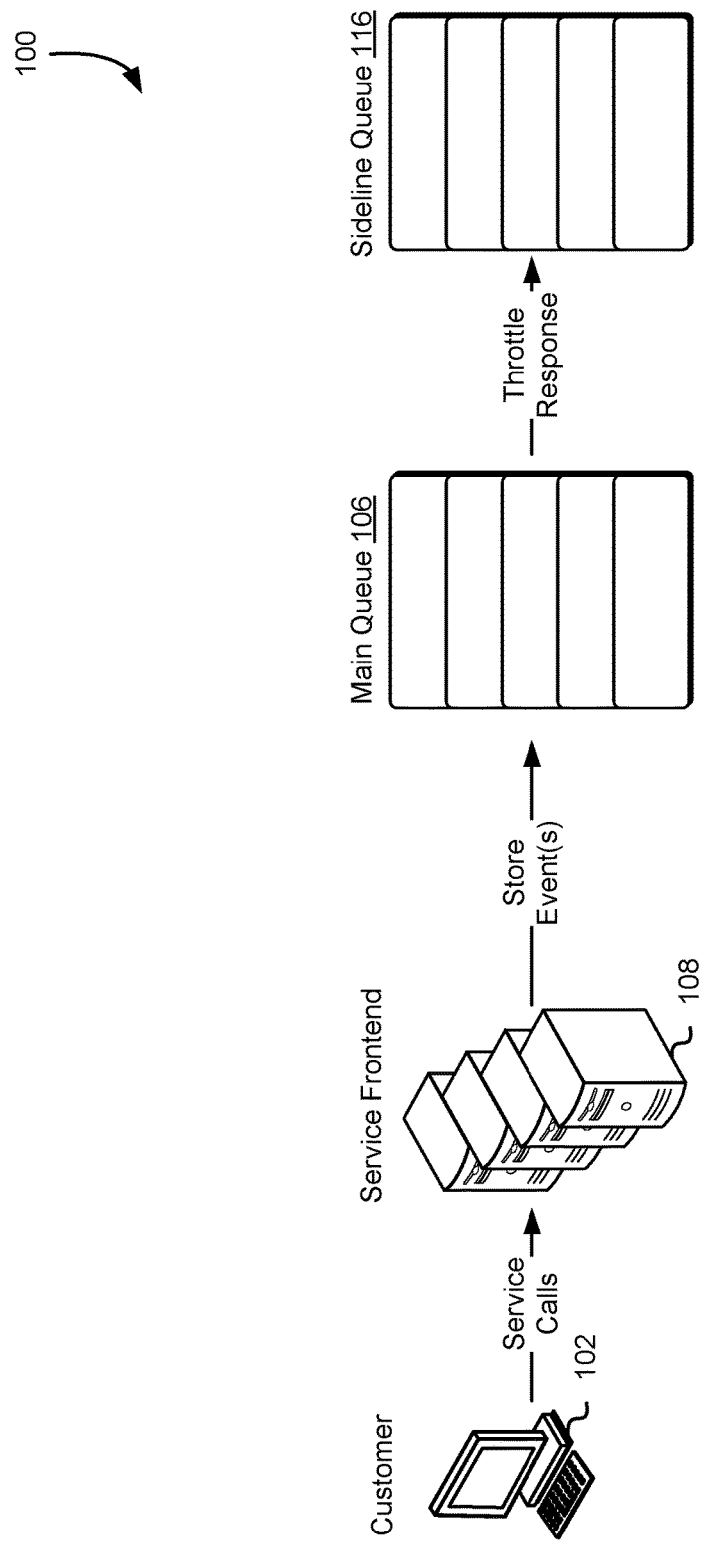
FIG. 1 illustrates an environment in which a service frontend manages customer events using a plurality of queues in accordance with at least one embodiment.

In various examples described below, a set of delivery hosts processes customer events and delivers customer events to one or more service endpoints. In certain situations, the one or more service endpoints may return a throttle response to a particular delivery host. The throttle response indicates, at least, that the service endpoint responsible for the throttle response is overloaded. As described in the present disclosure, a service endpoint or other computing resource becomes overloaded when the consumption of at least some measured capacity of the computing resource reaches a particular level and/or amount for at least one customer event. For example, a particular service endpoint is considered overloaded when the Central Processing Unit (CPU) utilization for the particular service endpoint is above 95 percent. As a result, the particular service endpoint may transmit a throttle response to a particular delivery host in response to one or more customer events transmitted by the particular delivery host to the particular service endpoint. To prevent users from causing a degradation of service, the delivery set of delivery hosts maintains information associated with customers and throttle response associated with the customers. This information allows the delivery hosts to queue or otherwise delay processing of certain customer events to prevent any degradation of service that may result from processing those customer events.

As described in greater detail below, customers of a service generate and transmit service calls, such as Application Programming Interface (API) calls and webservice calls, to a service frontend. In various embodiments, the service frontend queues customer events associated with the service calls in a main queue. Customer events include operations performed by the customer, operations requested by the customer, and any metadata associated with the service call. For example, a particular customer event includes information indicating a successful storage operation performed by a storage service on behalf of a particular customer and metadata associated with the storage operation such as file size, file name, file location, file type, date, time, user identification information, authentication information, or any other metadata. These customer events are obtained from the main queue by a delivery host and may be forwarded to a service endpoint for processing. In various embodiments, each customer event is associated with customer identification information so that customer events can be differentiated based at least in part on customer identification information.

As discussed above, a service endpoint may, in certain situations, respond to the customer event with a throttling signal. In various embodiments, the throttling signal includes the customer event and an indication that the customer event was not processed by the service endpoint. In yet other embodiments, the throttling signal simply includes an indication that the customer event was not processed by the service endpoint. In response to the throttling signal, the delivery host places the customer event in a sideline queue to delay processing of the customer events. Delaying processing of the customer event may allow the time for the service endpoint to move from an overloaded state to a non-overloaded state. In addition, in some embodiments, the service endpoint maintains per-customer throttle information such that a customer is limited to a certain amount of computing resources during an interval. In such embodiments, delaying the processing of the customer events allows customers to stay within their throttle limits without causing a degradation of service to other customers.

In various embodiments, the delivery hosts obtain requests from the main queue and the sideline queue at different rates. In addition, when processing customer requests from the queues (e.g., the main queue or sideline queue) the delivery host may determine whether to transmit the customer event to the service endpoint based at least in part on information, such as state information maintained about the customer. For example, a particular delivery host maintains state information about customers for which the delivery host has received a throttle response. The state information may include a tuple of customer identification information and a time interval indicating an interval not to transmit customer events within. In such examples, when the particular delivery host obtains a customer event from a queue associated with the customer (e.g., the customer identification information of the customer event matches customer identification information maintained by the delivery host), the delivery host determines whether to transmit the customer event to the service endpoint or enqueue the customer event in the sideline queue based at least in part on the time interval. Specifically, if the time interval indicates that a customer event was transmitted 60 second ago and the time interval is 90 seconds, the delivery host enqueue the customer event in the sideline queue. Alternatively, if no time interval is indicated or it is outside of the time interval, the delivery host forwards the customer event to the service endpoint for processing.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment 100 in which service calls from customers 102 are processed by a service frontend 108 using a plurality of queues to avoid degradations in service in accordance with an embodiment. As described in greater detail below the service frontend 108 may be a component of a service or set of services provided by a computing resource service provider. The customer 102 includes various entity utilizing computing resources provided by the computing resource service provider. In some embodiments, the customer 102 operates computing resources that interact with various components of a service provided by the computing resource service provider. In yet other embodiments, the customer 102 includes other services or computing resources of the computing resource service provider. Computing resources operated by the customer 102 generate service calls directed to the service frontend 108.

The service calls may include API calls, webservice calls, service requests, or any other request that may be processed by a service to cause some operation to be performed. In one example, the service call is a request to store data in a particular storage location provided by a storage service of the computing resource service provider. In another example, the service call is a request to provision computing resources to be operated by the customer 102. The service calls may be directed to a particular service of the computing resource service provider. For example, the service calls are directed to an address, such as a public Internet protocol (IP) address, associated with the service. This address may cause the service calls to be directed to a service frontend 108. The services of the computing resource service provider may share a set of service frontend 108 or each service may operate its own service frontend 108.

The service frontend 108 may include physical hardware such as a server computer. The server computer may be any device or equipment configured to execute instructions for performing data computation, manipulation, or storage tasks. A server computer may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications, or data transfer protocol. The physical hardware may also include storage devices, such as block-level storage devices, storage disks and tapes, networking equipment, and the like.

In various embodiments, the service frontend 108 generates a customer event based at least in part on the service call. The customer event may include any information associated with the service calls, the customer 102, a result of executing the service calls by a service endpoint described in greater detail below, or any other information generated or obtained as a result of receiving and/or processing the service calls. For example, the customer event may include a result of a storage operation request by the service call, a location of data storage during the storage operation, and metadata associated with the storage operation. In another example, the customer event is simply a request to modify the operation of a load balancer and a set of virtual computer system instances operated by the customer 102. The customer events may include any information necessary to enable a service endpoint to perform one or more operations on behalf of the customer 102. In some embodiments, the customer events include the service calls and the service calls may be structured in such a way that the service calls contain all the information necessary to enable a service endpoint to perform one or more operations on behalf of the customer 102.

Once the customer events have been generated or obtained, the customer events may be stored by the service fronted in a main queue 106. As described in greater detail below, the main queue 106 may simply be a storage location accessible to one or more other computing resources of the computing resource service provider so that the customer events may be processed. For example, the main queue 106 may be a storage location such as a file or folder within a file system stored on a storage device of the service frontend 108. In such scenarios, the customer events may be files stored within folders of the file system. In yet other embodiments, the main queue 106 is provided by another service of the computing resources service provider such as a queuing service. The queuing service may use computing resources of the computing resource service provider to enqueue customer events and provide customer events in response to a request to obtain information from the main queue 106.

As described in the present disclosure, any queuing algorithm may be used to implement the main queue 106 and sideline queue 116 such as priority queuing, fair queuing, weighted queuing, or other algorithm. In addition, the various queues described in the present disclosure may be implemented as any number of data structures and may maintain customer events in a First-In-First-Out (FIFO) data structure. For example, as discussed above the various queues may simply be a storage location that is available to the delivery hosts as described above. In various embodiments, the storage location is capable of processing a high volume of traffic and provides persistent data storage from the customer events. As illustrated in FIG. 1, customer events are processed from the main queue 106. The service frontend 108 or other computer system of the computing resource service provider, such as the delivery hosts described in greater detail below, may receive a throttle response from the service endpoint and, as a result, may place the customer event associated with the throttle response in a sideline queue 116. The sideline queue 116 may be a queue as described above.

In other embodiments, a single main queue 106 may become saturated with customer events from one or more customers that are currently being throttled (e.g., the service endpoint returns a throttle response instead of processing the one or more customers' requests). By maintaining those customer events in the sideline queue 116 the impact of the throttling on customers in the main queue 106 is reduced. In addition, as described in greater detail below, the service frontend 108 and/or delivery host maintains state information associated with one or more customers receiving throttle responses associated with customer events associated with the one or more customers. This provides the service frontend 108 and/or delivery host the ability to obtain a customer event from a queue and determine without communicating with the service endpoint if the particular customer associated with the customer event is likely to be throttled. If the customer event is likely to be throttled the service frontend 108 and/or delivery host may place the customer event in the sideline queue 116. The state information may be maintained in a wrapper around the customer event. The wrapper and customer event may be stored in a queue (e.g., the main queue 106 or the sideline queue 116), may be stored by the delivery hosts as described in greater detail below, or stored at various other locations accessible to the delivery hosts.

In various embodiments, the sideline queue 116 is drained (e.g., customer events are obtained from the sideline queue 116 for processing) at a slower rate than customer events from the main queue 106. These rates may be dynamically modified based at least in part on the depth and/or size of the queue. For example, if the main queue 106 is empty the service frontend 108 and/or delivery host may have logic or other executable code that causes the service frontend 108 and/or delivery host to request and/or obtain customer events from the main queue 106 less frequently than if there is at least one customer event in the main queue 106.

Figure 2:
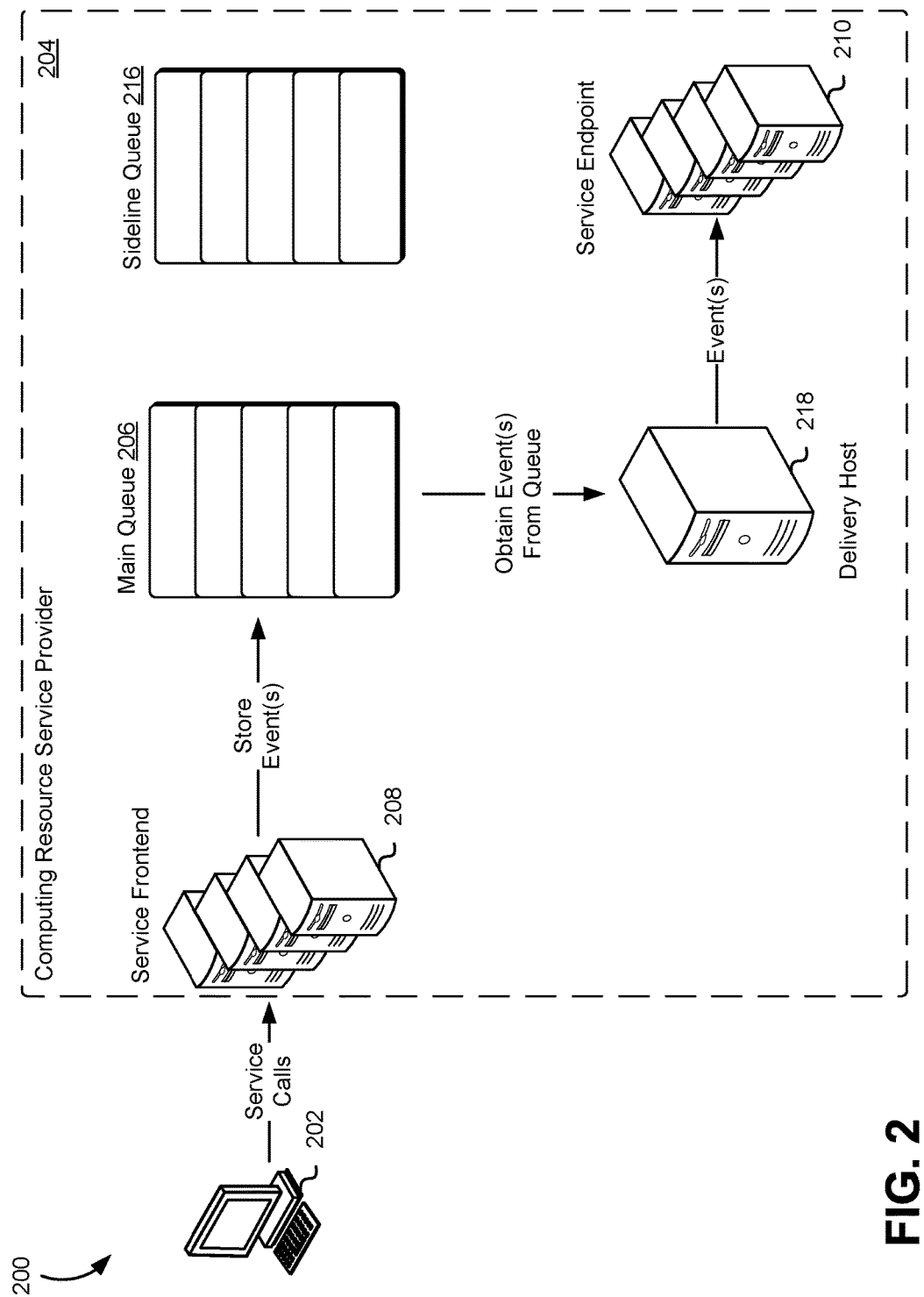
FIG. 2 illustrates an environment in which a delivery host processes customer events using a plurality of queues in accordance with at least one embodiment.

FIG. 2 illustrates an environment 200 in which service calls provided by one or more customers 202 are processed by a service of a computing resource service provider 204 in accordance with an embodiment. The customers 202 may include various entities as described above including other services of the computing resource service provider 204. The computing resource service provider 204 provides computing resources to customers 202 to execute various applications. The computing resources provided by the computing resource service provider 204 may be accessible to the customers 202 as one or more services. For example, the computing resource service provider 204 provides customers with access to virtual computing resources through a virtual computing service. Other examples of services, such as an on-demand storage service, block-level storage service, networking service, queuing service, messaging service, security service, auto-scaling service, stream service, or any other service are considered within the scope of the present disclosure.

These services may include various components for processing the service calls and performing other operations on behalf of the customers 202. In one embodiment, these components include a service frontend 208, delivery host 218, and service endpoint 210. In addition, these components may maintain a plurality of queues to store customer events awaiting processing by various components of the service such as the delivery host 218 and/or service endpoint 210. These queues include a main queue 206 and a sideline queue 216. These queues may include a variety of data structures or data storage locations as described above. In one example, the main queue 206 and/or sideline queue 216 is a storage location on a storage device operated by the service frontend 208. In another example, the main queue 206 and/or sideline queue 216 is a data structure maintained by the queue service of the computing resource service provider 204.

As illustrated by FIG. 2, the computing resource service provider 204 may provide the customers 202 with access to one or more computing resources provided through the service endpoints 210. As described in greater detail below, the computing resource service provider 204 may operate host computer systems organized into one or more data centers. The host computer systems may provide computing resources to execute various entities, such as the service frontend 208, the delivery host 218, and the service endpoint 210. The host computer systems may include service computer systems or a component thereof (e.g., virtual computing instance supported by the server computer system) as described above in connection with FIG. 1. For example, the delivery host 218 is a virtual device executed using computing resources of a host computer system. A single host computer system may support the execution of a plurality of delivery hosts 218.

Additionally, the customers 202 may include an individual that utilizes the services of the computing resource service provider 204 to perform various operations. Not shown in FIG. 2 for simplicity, the customers 202 may communicate with the computing resource service provider 204 through a network whereby the network may be a communication network, such as the Internet, an intranet or an Internet service provider (ISP) network. Some communications from the customers 202 to the computing resource service provider 204 may cause the computing resource service provider 204 to operate in accordance with one or more embodiments described or a variation thereof, for example, by processing service calls into customer events to be further processed by the service endpoint 210. In various embodiments, the customers 202 include other services or computing resources operated by the computing resource service provider 204 or other entity.

In various embodiments, the main queue 206 and/or sideline queue 216 may be an application, host controller, or other executable code, device, or combination thereof that manages a queue for the computing resource service provider 204 or service thereof. Furthermore, the main queue 206 and/or sideline queue 216 includes a queue that enables delaying of customer events (e.g., service calls) such that the customer events are processed to avoid degradation of service caused by the throttling by the service endpoints 210 of particular customers. The order of execution may be determined based at least in part on state information maintained by the delivery hosts 218 described in greater detail below.

In various embodiments, the delivery hosts 218 when processing customer events from the main queue 206 and/or sideline queue 216 queries a local cache to obtain state information associated with the customer event to be processed. Based at least in part on a result of querying the local cache the delivery host 218 may transmit the customer event to the service endpoint 210 for processing or place the customer event in the sideline queue 216. In addition, the delivery host 218 may place the customer event in the sideline queue 216 with an interval of time the customer event is to be hidden. Specifically, if the delivery host 218 requests customer events from the sideline queue 216 any customer event within the time interval it is to be hidden will not be returned in response to the request.

Returning to FIG. 2, if the delivery host 218 does not have state information associated with the customer and/or customer event or if the state information indicates that the customer may no longer be throttle by the service endpoint, the delivery host 218 forwards the customer event to the service endpoint 210 for processing. The service endpoints 210 include one or more computing resources (e.g., physical computing resources, virtual computing resources, and/or distributed computing resources) that implement a service accessible via a network address associated with the service. Note that the service endpoints 210 could comprise multiple devices (e.g., a combination of physical or virtual devices), such as when the network address corresponds to a load balancer that routes traffic to a plurality of redundant servers.

In various embodiments, the delivery hosts 218 determine a particular service endpoint to transmit the customer event to for processing, in addition to determining whether the particular customer associated with the customer event is likely to be throttled by the particular service endpoint. The delivery host 218 may be specific to a particular customer or service. In addition, in some embodiments, customer events are distributed to particular delivery hosts based at least in part on a hash value generated by at least hashing a customer identification number associated with the customer 202. For example, a hash ring is used to map customers 202 to a particular delivery host and the particular delivery host maintains the main queue 206 and/or the sideline queue 216 for all of the customers that map to that particular delivery host.

Figure 3:
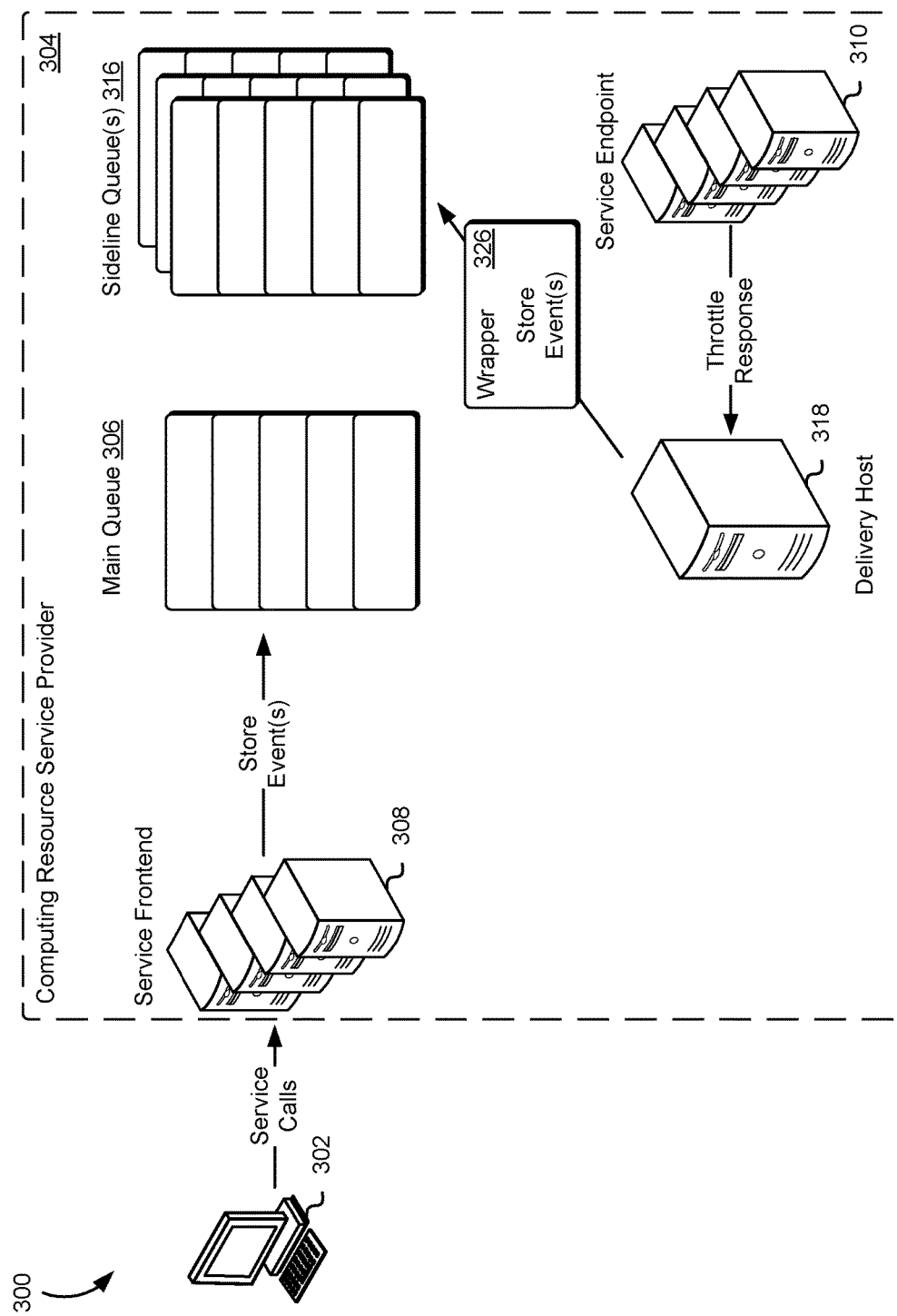
FIG. 3 illustrates an environment in which a delivery host processes customer events using a plurality of queues in accordance with at least one embodiment.

FIG. 3 illustrates an environment 300 in which a service endpoint 310, operated by a computing resource service provider 304, provides a throttle response to a delivery host 318 in accordance with an embodiment. As described in greater detail above, a customer 302 may provide service calls to a service frontend 308. For example, the service frontend 308 exposes a public network address to which the customer 302 submits service calls, such as API call or webservice calls. Furthermore, the service calls may be stored as customer events in a main queue 306 as described above. In addition to the main queue 306 the service frontend 308 or other component of the computing resource service provider 304, a sideline queue 316 is provided to enqueue customer events associated with customers that are being or have been throttle by the service endpoint. As illustrated in FIG. 3, a plurality of sideline queues 316 may be used to manage customer events. For example, a particular sideline queue may be used to store plurality of customer events from a subset of customers of the computing resource service provider 304. Specifically, customer information may be hashed and based at least in part on a result of the hash customer events may be associated and/or stored with a particular sideline queue of the plurality of sideline queues 316.

The computing resource service provider 304 may provide various computing resources to the customer 302. The services provided by the computing resource service provider 304 may include a virtual computer system service, a block-level data storage service, a cryptography service, an on-demand data storage service, a notification service, an authentication system, a policy management service, a task service, messaging service, queuing service, and one or more other services as described in the present disclosure. It is noted that not all embodiments described include the services described above, and additional services may be provided in addition to or as an alternative to services explicitly described. As described above, in a multi-tenant environment during periods of increased activity, computing resources may become overloaded which may lead to a decrease in availability and an increase in latency of the computing resources to process requests on behalf of the customer 302. Increased latency may violate the terms of a service-level agreement (SLA). An SLA may be part of a service contract or other agreement between a computing resource service provider 304 and the customer 302 where a particular service is formally defined. Particular aspects of the service (e.g., scope, quality, responsibilities, latency, availability) may be agreed on between the computing resource service provider 304 and the customer 302.

In order to avoid such scenarios, the service endpoints 310 may provide a throttle response, described in greater detail below, which causes a delivery host 318 to perform various operations. As described above, the delivery host 318 may be a server computer system or component thereof that is responsible for obtaining customer events from the main queue 306 and/or sideline queue 316 and transmitting the customer events to the service endpoint 310. For example, the delivery hosts 318 may be a virtual computer system instance supported by a virtualization layer (e.g., a hypervisor) executed by physical computing resources such as a server computer system. In response to a throttle response the delivery host 318 may place the customer event in the sideline queue 316, store and/or update information associated with the throttle response and/or the customer event, or other operations as described in the present disclosure.

The service endpoint 310 may maintain a set of throttling rules or throttling policy that indicates when customer events are to be throttled. For example, if the counter representing the number of customer events received from a particular customer is above a threshold value any subsequent customer event from the particular customer may be throttled. In another example, requests may be throttled if, after providing an initial throttling response, the service endpoints 310 continue to receive customer events. In addition, the delivery host 318 may maintain a set of throttling rules or throttling policy to determine when to place customer events in the sideline queue 316. For example, the throttling rules include logic or other executable code that causes the delivery host 318 to place a customer event in the sideline queue 316 in response to a throttle response associated with the customer event. In addition to placing the customer event in the sideline queue 316, the delivery host 318 may perform additional operations.

For example, various feedback control algorithms may be used to determine whether the service endpoint is likely to continue throttling a particular customer and/or customer event (e.g., if the delivery host 318 was to send the customer request to the service endpoint 310 would the delivery host receive a throttle response). For example, an additive-increase/multiplicative-decrease (AIMD) algorithm may be used to determine throttling information such as duration of time to wait prior to sending the customer event to the service endpoint 310 and/or duration of time to make the customer event hidden or inaccessible while in the sideline queue 316. Under the AIMD algorithm, w(t) represents the transmit rate during time interval t. If the delivery host 318 does not receive a throttle response, based at least in part on the throttling policy, then w(t+1)=w(t)±a where a>0. Specifically, the delivery host 318 does not receive a throttle response, the interval of time not to send the customer event to the service endpoint 310 is reduced by the value a. However, if delivery host 318 receives throttle response, then (t+1)=w(t)×b where b>0. This may combine linear reducing of the waiting/delaying window with an exponential increase when throttling takes place. Other schemes include multiplicative-increase/multiplicative-decrease (MIMD) and additive-increase/additive-decrease (AIAD).

Although a computing resource service provider environment is illustrated in FIG. 3, the techniques described may be used in a plurality of environments. For example, the techniques described may be used to process requests directed to a disk drive (e.g., input/output operations). In addition, although only one delivery host 318 is illustrated in FIG. 3, a plurality of delivery hosts may be used in accordance with the present disclosure. For example, in an embodiment, there is a first delivery host for the main queue 306 and a second delivery host for the sideline queue 316. The first delivery host and the second delivery host may be identical but for the rate at which each delivery host obtains customer events from each queue. In addition, when the delivery host 318 receives the throttle response, the delivery host 318 may generate and/or store state information associated with the customer event in a wrapper 326 around the customer event. For example, the delivery host 318 may store state information including customer identification information, an amount of time to delay processing the customer event, a number of attempts to process the customer event, and an amount of time the customer event is inaccessible to the delivery host 318 in a wrapper 326 around the customer event, generating a wrapped customer event, and providing the wrapped customer event to the sideline queue 316.

Figure 4:
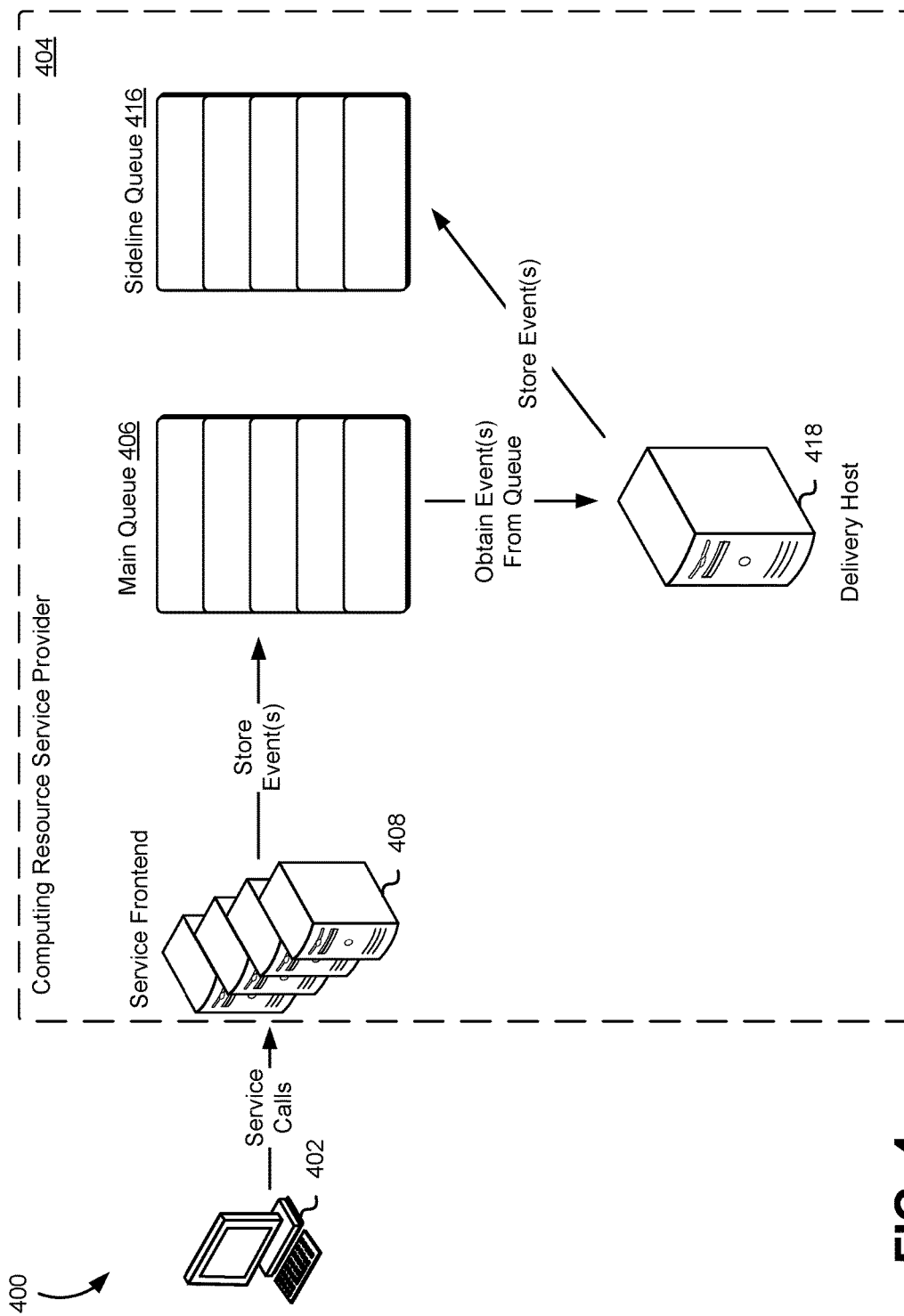
FIG. 4 illustrates an environment in which a delivery host processes customer events using a plurality of queues in accordance with at least one embodiment.

FIG. 4 illustrates an environment 400 in which a delivery host 418 determines to place a customer event in a sideline queue based at least in part on state information maintained by the delivery host 418 in accordance with an embodiment. As described in greater detail above, a customer 402 may provide service calls to a service frontend 408. For example, the service frontend 408 exposes a public network address to which the customer 402 submits service calls, such as API call or webservice calls. Furthermore, the service calls may be stored as customer events in a main queue 406 as described above. In addition to the main queue 406 the service frontend 408 or other component of the computing resource service provider 404, the sideline queue 416 is provided to enqueue customer events associated with customers that are being or have been throttled by a service endpoint.

The computing resource service provider 404 may provide various computing resources to the customer 402 as described above. As illustrated in FIG. 4, the delivery host 418, as described in greater detail above, obtains a customer event from the main queue 406. The delivery host 418 obtains the customer event from the main queue 406 by querying a queuing service, queue data structure, or accessing a storage location as described above. The delivery host 418 may then determine the customer 402 associated with the customer event based at least in part on customer identification information, such as a customer ID number or other information unique to the customer 402 relative to other customers of the computing resource service provide 404.

The delivery host 418 may then obtain and/or query state information maintained by the delivery host based at least in part on the customer identification information. As described above, the state information maintained by the delivery host 418 may include customer identification information, a throttle response received, number of times the customer event has been transmitted to the service endpoint, a duration of time to wait prior to sending the customer event to the service endpoint, a last time the customer event was transmitted to the service endpoint, or any other information suitable for determining whether to place the customer event in the sideline queue 416. For example, the state information may indicate that for the customer 402, the delivery host 418 attempted to deliver the customer event to the service endpoint 30 seconds ago and a throttle response was received.

In addition, the state information may indicate that there is currently a time interval not to send of 60 seconds and therefore the delivery host 418 determines that not to send the customer event because the customer event is currently within the time interval not to send. As described in greater detail below, at some point in time later the customer event may be obtained from the sideline queue 416 at a point in time outside of the time interval not to send at which point the delivery host 418 may transmit the customer event to the service endpoint. As illustrated in FIG. 4, instead of transmitting the customer event to the service endpoint, the delivery host 418 stores the customer event in the sideline queue 416.

Figure 5:
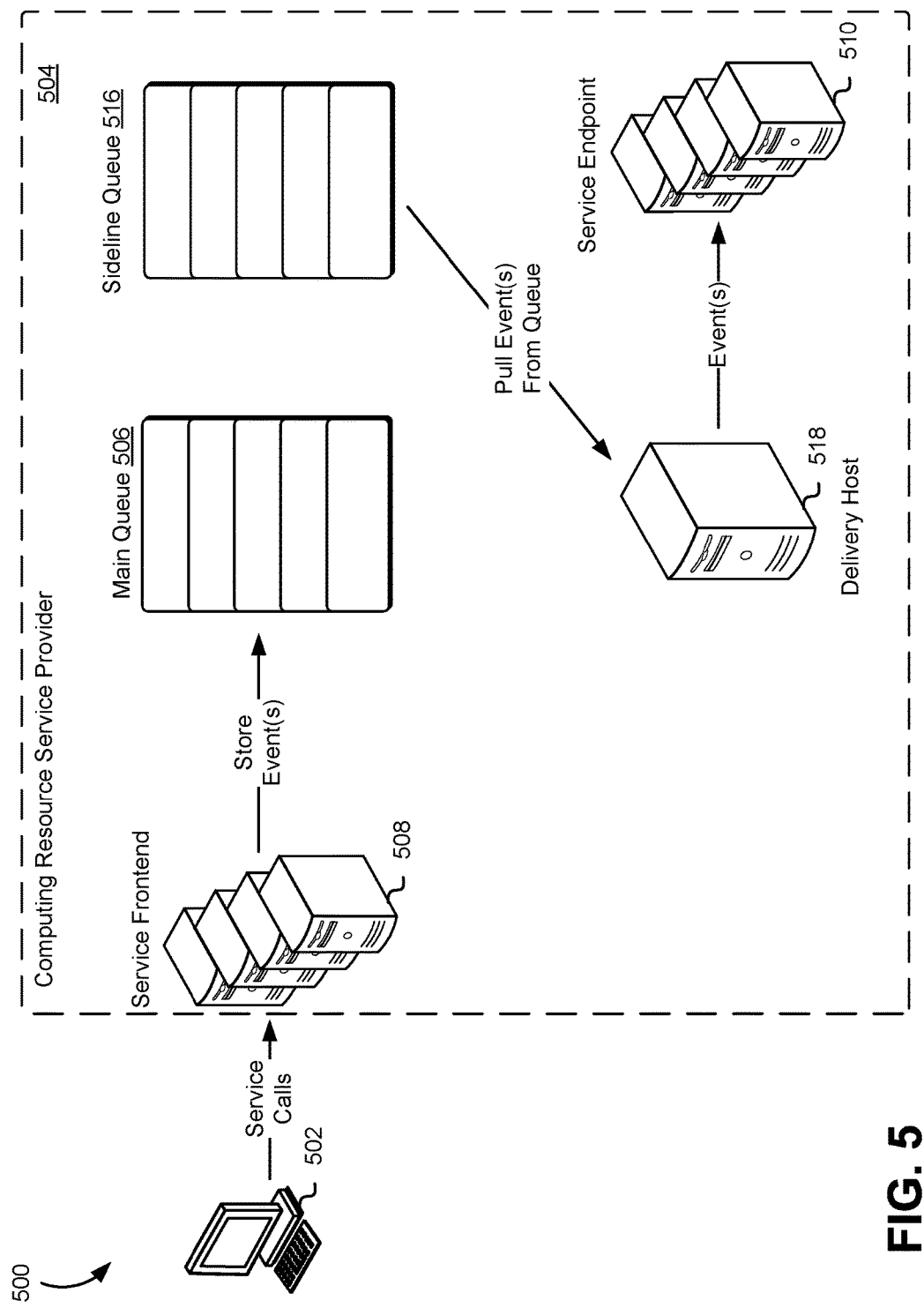
FIG. 5 illustrates an environment in which a delivery host processes customer events using a plurality of queues in accordance with at least one embodiment.

FIG. 5 illustrates an environment 500 in which a service endpoint 510, operated by a computing resource service provider 504, processes a customer event obtained from a delivery host 518 in accordance with an embodiment. As described in greater detail above, a customer 502 may provide service calls to a service frontend 508. For example, the service frontend 508 exposes a public network address to which the customer 502 submits service calls, such as API call or webservice calls. Furthermore, the service calls may be stored as customer events in a main queue 506 as described above. In addition to the main queue 506 the service frontend 508 or other component of the computing resource service provider 504, a sideline queue 516 is provided to enqueue customer events associated with customers that are being or have been throttle by the service endpoint.

The computing resource service provider 504 may provide various computing resources to the customer 502 as described above. In addition as illustrated in FIG. 5, the delivery host 518 obtains customer events from the sideline queue 516. As described above, customer events are placed in the sideline queue 516 by the delivery host 518 in response to a throttle response or as a result of a likelihood of a particular customer event being throttled based at least in part on the customer 502 associated with the customer event. The delivery host 518 obtains customer events from the sideline queue 516. In addition, the delivery host 518 obtains and/or determines the current state information associated with the customer event as described above. For example, the delivery host 518 queries a local cache for information associated with the customer 502.

As described above, if the state information indicates that the customer 502 and/or customer event is within a time interval not to send, the delivery host 518 places the customer event in the sideline queue 516. However, if the state information indicates that the customer 502 and/or customer event is outside of the time interval not to send, the delivery host 518 may transmit the customer event to the service endpoint 510. In another example, if the delivery host 518 does not have any state information associated with the customer 502 and/or customer event, the delivery host 518 transmits the customer event to the service endpoint 510. In various embodiments, the delivery host 518 processes customer events in parallel. For example, delivery host 518, obtains 10 customer events from the sideline queue 516 at one time and processes all 10 customer events contemporaneously or near contemporaneously. Alternatively, the delivery host 518 may process customer events in serial or in a particular sequence.

Figure 6:
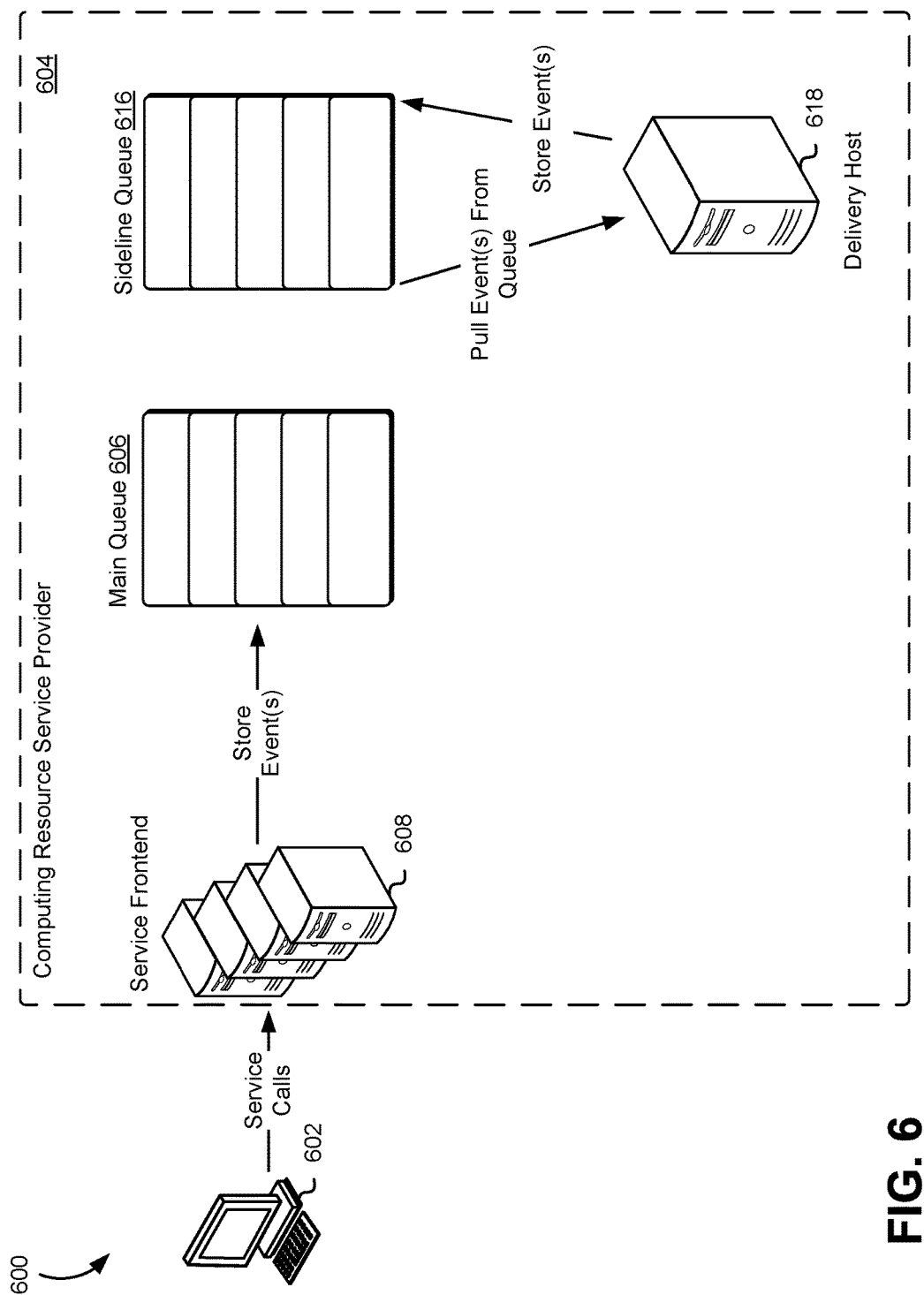
FIG. 6 illustrates an environment in which a delivery host processes customer events using a plurality of queues in accordance with at least one embodiment.

FIG. 6 illustrates an environment 600 in which a delivery host determines to place a customer event in a sideline queue 616 in accordance with an embodiment. As described in greater detail above, a customer 602 may provide service calls to a service frontend 608. For example, the service frontend 608 exposes a public network address to which the customer 602 submits service calls, such as API calls or webservice calls. Furthermore, the service calls may be stored as customer events in a main queue 606 as described above. In addition to the main queue 606 the service frontend 608 or other component of the computing resource service provider 604, a sideline queue 616 is provided to enqueue customer events associated with customers that are being or have been throttle by the service endpoint.

The computing resource service provider 604 may provide various computing resources to the customer 602 as described above. As illustrated in FIG. 6, the delivery host 618 obtains customer events from the sideline queue 616. As described above, the delivery host 618 may determine and/or obtain state information associated with the customer event. In the embodiment illustrated in FIG. 6, the delivery host 618 determines that the customer event is to be placed back in the sideline queue 616. For example, the state information indicates that the customer event is still within the time interval not to send or otherwise indicates the customer event will be throttled by the service endpoint.

In addition to placing the customer event back in the sideline queue the delivery host 618 may update the state information. For example, as described above, the interval of time not to send may be increased. Other state information may include a number of times the customer event has been throttled, a number of times the customer event has been placed in the sideline queue 616, a number of times the customer event has been delayed, a length of time the customer event has been hidden, or any other information suitable for making a determination to place a customer event in the sideline queue or transmit the customer event to a service endpoint.

In various embodiments, the delivery host 618 may place the customer event in a dead letter queue after an interval of time and/or a certain number of retry attempts. The dead letter queue may be a queue or other data structure in a computer system storing customer requests for which automated processing has failed. In various embodiments, the operations described above are performed without a queue or other data structure. For example, the delivery host 618 may simply determine whether to transmit the customer events to the service endpoint or sideline the customer event or otherwise delay transmission of the customer event until a point in time at which the delivery host 618 determines again whether to transmit the customer event or delay transmission. In yet other embodiments, the delivery host 618 may perform additional operations in addition to or in place of storing the customer event in the sideline queue. For example, the delivery host 618 may delete the customer event, transmit an error message to the customer, place the customer event in the main queue 606, transmit a notification of a retry to the customer 602, or any other operation suitable for processing the customer events.

Figure 7:
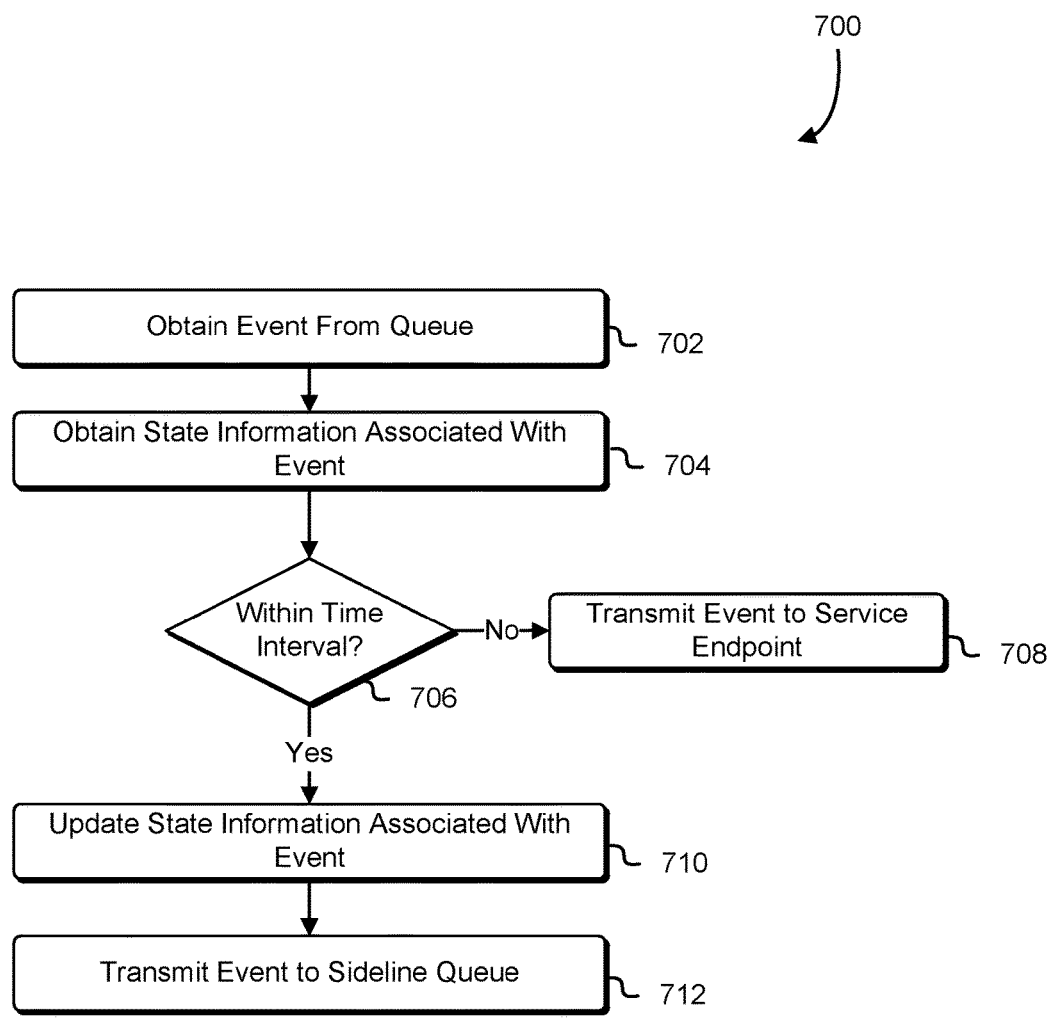
FIG. 7 illustrates a process which may be used to process customer events using a plurality of queues in accordance with at least one embodiment.

FIG. 7 is a block diagram illustrating an example of a process 700 for processing customer events based at least in part on state information associated with the customer event in accordance with at least one embodiment. Some or all of the process 700 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 700 may be performed by any suitable system, such as a server in a data center, by various components of the environment 200 described in conjunction with FIG. 2, such as the delivery host 218, by multiple computing devices in a distributed system of a computing resource service provider, or by a service provided by a computing resource service provider. The process 700 includes obtaining a customer event from a queue 702. As described in greater detail above, the delivery host may obtain requests from a main queue or sideline queue. In addition, the queue may be a storage location or another data structure besides a queue. The delivery host may obtain one or more customer events in parallel from the queues. The delivery host may then obtain state information associated with the customer event 704. The state information may include a variety of different information suitable for determining whether to transmit the customer event to a service endpoint or place the customer event in a queue as described above. For example, the state information may indicate a particular customer and an interval of time during which customer event associated with the particular customer are to be placed in the sideline queue.

Returning to FIG. 7, the delivery host then determines whether the customer event is within a time interval 706. The time interval may indicate an interval not to send, as discussed above. Other intervals, such as an interval to send, are considered within the scope of the present disclosure. If the delivery host determines that the customer event is not within the interval, the delivery host may transmit the customer event to the service endpoint for processing 708. In response, the service endpoint may process the customer event or return a throttle response discussed in greater detail below. However, if the delivery host determines that the customer event is within the interval not to send, the delivery host may then update the event state 710. For example, the delivery host may increment a counter in cache indicating a number for the time customer events for a particular customer have been placed in the sideline queue.

The delivery host may then transmit the customer event from the sideline queue 712. As described above, the delivery host may transmit the customer event to a queuing service for storage. In addition, the delivery host may indicate an interval for which the queuing service is not to return the customer event in response to a query from the delivery host. For example, the delivery host queries the queuing service for a number of customer events included in the sideline queue, the queuing service will not return the customer event despite the customer event being in the sideline as a result of the time interval to hide the customer event. Note that one or more of the operations performed in 702-712 may be performed in various orders and combinations, including in parallel. For example, the system executing the process 700 may update the event state information at the same time as transmitting the event to the sideline queue. In numerous variations to the process 700, one or more of the operations 702-716 may be omitted or performed by other systems or services. For example, the delivery host may not update the state information associated with the customer event.

Figure 8:
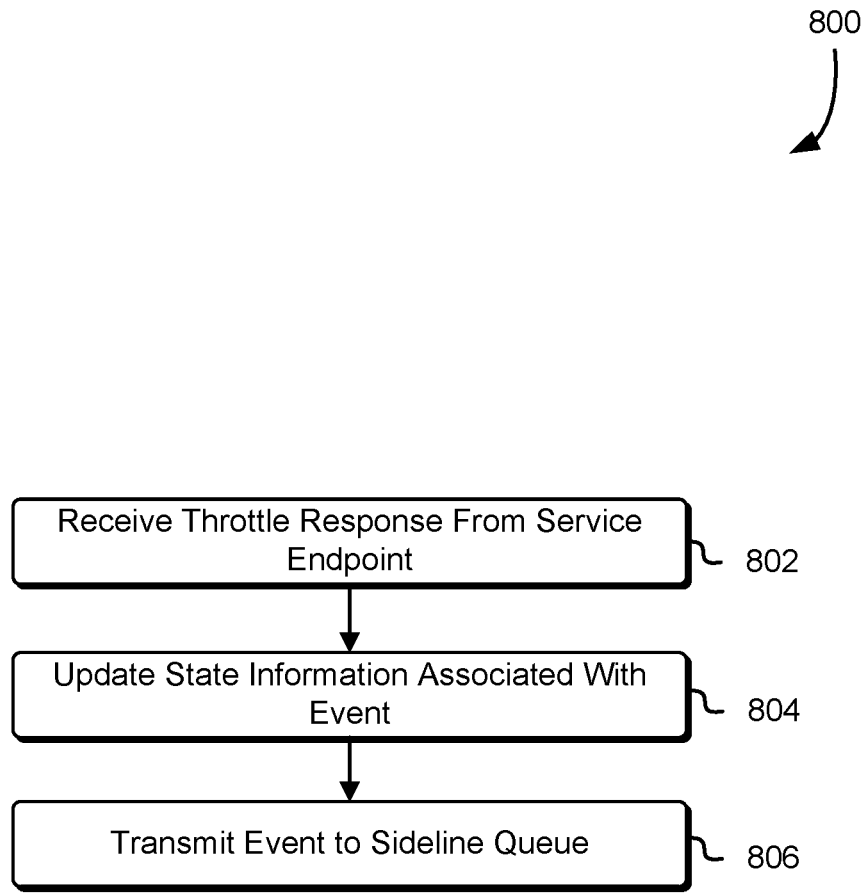
FIG. 8 illustrates a process which may be used to process customer events using a plurality of queues in accordance with at least one embodiment.

FIG. 8 is a block diagram illustrating an example of a process 800 for updating state information associated with a customer event in accordance with at least one embodiment. Some or all of the process 800 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 800 may be performed by any suitable system, such as a server in a data center, by various components of the environment 300 described in conjunction with FIG. 3, such as the delivery host 318, by multiple computing devices in a distributed system of a computing resource service provider, or by a service provided by a computing resource service provider. The process 800 includes receiving a throttle response from a service endpoint 802. As described above, the throttle response may be transmitted by the service endpoint as a result of a particular customer submitting a number of customer events that exceeds a throttling limit.

In response to the throttle response the delivery host may update the state information associated with the customer event 804. For example, the delivery host may increase the time interval not to send by a factor. Specifically, a multiplicative increase strategy may be used exponentially to increase the interval of time not to transmit customer events to the service endpoint. In various embodiments, a maximum interval may be set for the interval of time not to send. For example, the maximum interval not to send a particular customer event is set at 15 minutes. Other state information may be updated as described above, for example, the number of attempts to transmit the customer event to the service endpoint may be incremented. In addition to updating the state information the delivery host may then transmit the event to the sideline queue 806. In other words, the delivery host may enqueue the customer event in the sideline queue for processing at a later point in time. Note that one or more of the operations performed in 802-806 may be performed in various orders and combinations, including in parallel. For example, the system executing the process 800 may update the event state information at the same time as transmitting the event to the sideline queue.

Figure 9:
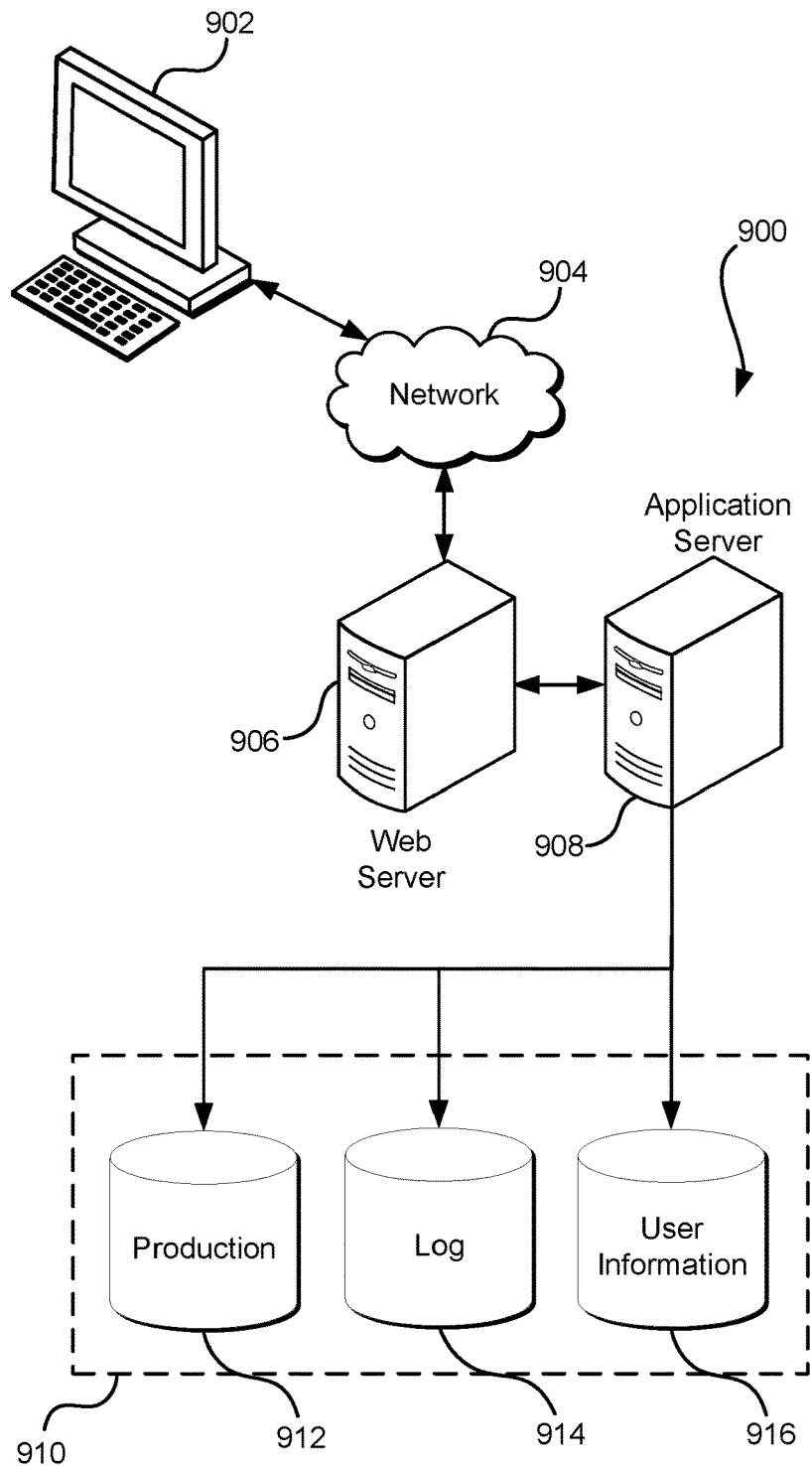
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes, and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update, or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIF S"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle °, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a service call generated based at least in part on an input obtained from a customer;
   generating a customer event including customer identification information based at least in part on the service call;
   enqueuing the customer event in a main queue to be processed by a delivery host of a set of delivery hosts in a distributed computing environment;
   transmitting, by the delivery host, the customer event to a service endpoint for processing;
   receiving, in response to the transmission of the customer event, a throttle response from the service endpoint;
   processing the throttle response by at least:
      enqueuing the customer event in a sideline queue; and
      storing, by the delivery host, a current state associated with the customer event, the current state including the customer identification information and an interval of time determined based at least in part on the customer event and the throttle response, the interval of time indicating that after an expiration of the interval of time the customer event may be transmitted to the service endpoint;
   obtaining, by the delivery host, the customer event; and
   determining to transmit the customer event to the service endpoint based at least in part on the interval of time indicated in the current state.

2. The computer-implemented method of claim 1, wherein the computer-implemented method further comprises:
   obtaining the customer event from the sideline queue;
   obtaining the current state associated with the customer event; and
   determining based at least in part on the interval of time to enqueue the customer event in the sideline queue.

3. The computer-implemented method of claim 1, wherein the computer-implemented method further comprises:
   obtaining the customer event from the sideline queue;
   transmitting, by the delivery host, the customer event to the service endpoint for processing;
   receiving a second throttle response from the service endpoint;
   updating the current state by at least increasing the interval of time; and
   enqueuing the customer event in the sideline queue.

4. The computer-implemented method of claim 3, wherein enqueuing the customer event in the sideline queue further comprises enqueuing the customer event in the sideline queue with a second interval of time indicating a duration of time during which the customer event is inaccessible to the delivery host.

5. A system, comprising:
   one or more processors; and
   memory to store computer-executable instructions that, if executed by the one or more processors, cause the one or more processors to:

store a customer event in a first storage location, the customer event associated with operations performed by a service on behalf of a customer;
obtain the customer event from the first storage location;
transmit the customer event to a service endpoint;
receive a throttle response in response to the customer event;
cause state information associated with the customer event to be stored, the state information indicating an amount of time to delay transmission of the customer event to the service endpoint; and
store the customer event including additional state information in a second storage location as a result of receiving the throttle response.

6. The system of claim 5, wherein the computer-executable instructions further include instructions that cause the one or more processors to obtain a plurality of customer events from the first storage location or the second storage location.

7. The system of claim 5, wherein the first storage location and the second storage location further comprise a queue.

8. The system of claim 7, wherein the first storage location and the second storage location are maintained by a queuing service.

9. The system of claim 5, wherein the computer-executable instructions further include instructions that cause the one or more processors to:
obtain a second customer event from the first storage location;
obtain the state information based at least in part on customer identification information associated with the second customer event and the customer event; and
determine an operation to perform on the second customer event based at least in part on the state information.

10. The system of claim 9, wherein the operation further comprises storing the second customer event in the second storage location.

11. The system of claim 5, wherein the additional state information further comprises a value indicating a number of times the customer event has been transmitted to the service endpoint.

12. The system of claim 11, wherein the additional state information is stored in a wrapper around the customer event maintained in the second storage location.

13. A set of non-transitory computer-readable storage media comprising executable instructions that, upon execution by one or more processors of a computer system, cause the computer system to:
obtain a request from a first storage location, the request indicating an operation to be performed by a service;
transmit the request to the service;
receive a throttle response in response to the request;
obtain state information associated with the request based at least in part on identification information associated with the request, the state information indicating a duration of time at an expiration of which the request is to be transmitted to the service and the at least a portion of the state information is distributed among computer systems;
enqueue the request including the state information in a second storage location as a result of receiving the throttle response; and
transmit the request to the service based at least in part on the duration of time indicated in the state information.

14. The set of non-transitory computer-readable storage media of claim 13, wherein the executable instructions that cause the computer system to transmit the request to the service further include instructions that cause the computer system to transmit the request to a service endpoint associated with the service.

15. The set of non-transitory computer-readable storage media of claim 14, wherein:
the throttle response is received from the service endpoint, the throttle response indicating that a customer associated with the request is being throttled by the service and the request dropped by the service endpoint; and
the executable instructions further comprise instructions that, as a result of being executed by the one or more processors, cause the computer system to update the state information based at least in part on the throttle response.

16. The set of non-transitory computer-readable storage media of claim 13, wherein the executable instructions that cause the computer system to transmit the request further include instructions that cause the computer system to enqueue the request in a sideline queue including a value indicating an interval of time, the request being inaccessible in the sideline queue during the interval of time.

17. The set of non-transitory computer-readable storage media of claim 16, wherein the executable instructions that cause the computer system to enqueue the request in the sideline queue further include instructions that cause the computer system to enqueue the request in the sideline queue of a plurality of sideline queues based at least in part on the identification information associated with the request where each sideline queue of the plurality of sideline queues is associated with distinct identification information.

18. The set of non-transitory computer-readable storage media of claim 16, wherein the executable instructions that cause the computer system to update the state information further include instructions that cause the computer system to include, in a wrapper associated with the request, a value indicating a number of times the request has been transmitted to the service.

19. The set of non-transitory computer-readable storage media of claim 13, wherein the executable instructions that cause the computer system to perform the operation further include instructions that cause the computer system to transmit the request to transmit a notification to a network address associated with a customer responsible for providing the request.

20. The set of non-transitory computer-readable storage media of claim 13, wherein the executable instructions further comprise instructions that, as a result of being executed by the one or more processors, cause the computer system to:
transmit the request to a service endpoint associated with the service; and
update the state information by at least reducing the duration of time in response to not receiving the throttle response from the service endpoint.

* * * * *